United States Patent
Fletcher et al.

(10) Patent No.: US 9,747,760 B2
(45) Date of Patent: Aug. 29, 2017

(54) SAFETY EQUIPMENT CRITERIA VERIFICATION

(71) Applicant: International Business Machines Corporation, Armonk, NY (US)

(72) Inventors: James C. Fletcher, Apex, NC (US); Avraham Leff, Spring Valley, NY (US); James T. Rayfield, Ridgefield, CT (US); Umut Topkara, Scarsdale, NY (US); Justin D. Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/618,062

(22) Filed: Feb. 10, 2015

(65) Prior Publication Data

US 2016/0232758 A1 Aug. 11, 2016

(51) Int. Cl.

| | | |
|---|---|---|
| *G08B 1/00* | (2006.01) | |
| *G08B 3/10* | (2006.01) | |
| *H04B 17/318* | (2015.01) | |
| *G08B 21/02* | (2006.01) | |

(Continued)

(52) U.S. Cl.
CPC ............... *G08B 3/10* (2013.01); *G08B 5/36* (2013.01); *G08B 21/02* (2013.01); *G08B 21/0247* (2013.01); *H04B 17/318* (2015.01); *H04B 17/23* (2015.01)

(58) Field of Classification Search
CPC .. G08B 13/22; G08B 21/0247; G08B 13/196; G08B 13/19656; G08B 21/02; G08B 21/043; H04M 1/7253; H04W 4/02; G06K 19/0717; G06K 19/0723; G06K 19/07345;

(Continued)

(56) References Cited

U.S. PATENT DOCUMENTS

| | | |
|---|---|---|
| 6,199,550 B1 | 3/2001 | Wiesmann et al. |
| 6,700,497 B2 | 3/2004 | Hibbs et al. |

(Continued)

FOREIGN PATENT DOCUMENTS

CA 2588299 A1 10/2008

OTHER PUBLICATIONS

Unknown, "Personal Protective Equipment," United States Department of Labor Occupational Safety and Health Administration, OSHA 3151-12R, 2003, https://www.osha.gov/Publications/osha3151.html.

*Primary Examiner* — Daniel Previl
(74) *Attorney, Agent, or Firm* — Joseph W. Cruz

(57) ABSTRACT

Verifying a set of safety equipment criteria may include receiving a first unit of data at a first computing device. The first unit of data may be received via a wireless signal between the first computing device and a set of sensing devices. A set of safety equipment that includes the set of sensing devices may be identified as the first unit of data. The set of sensing devices may be configured to transmit the first unit of data. The wireless signal between the first computing device and the set of sensing devices may be monitored and the signal strength for the wireless signal may be determined to be below a threshold value. A second computing device may be notified in response to the determining that the signal strength for the wireless signal is below the threshold value.

20 Claims, 5 Drawing Sheets

(51) Int. Cl.
*G08B 5/36* (2006.01)
*H04B 17/23* (2015.01)

(58) Field of Classification Search
CPC ....... G06K 19/07749; G06K 19/07758; G06K 19/07767; G06K 9/00771; G06K 9/00369
USPC .. 340/532, 8.1, 686.1, 572.1, 573.1, 539.15, 340/539.21, 692, 539.23
See application file for complete search history.

(56) References Cited

U.S. PATENT DOCUMENTS

| | | | |
|---|---|---|---|
| 7,598,916 B2* | 10/2009 | Inbal | H01Q 1/1207 343/718 |
| 7,696,887 B1* | 4/2010 | Echavarria | G08B 21/0227 340/573.1 |
| 7,911,339 B2 | 3/2011 | Vock et al. | |
| 8,112,820 B2* | 2/2012 | Johnson | A41D 19/0089 2/160 |
| 8,203,458 B2* | 6/2012 | Kaneblei | A42B 3/046 2/410 |
| 8,341,762 B2 | 1/2013 | Balzano | |
| 8,380,126 B1* | 2/2013 | Ma | A61B 5/7475 455/41.2 |
| 8,925,115 B1* | 1/2015 | Hanna | F41H 1/02 2/102 |
| 9,492,690 B2* | 11/2016 | Hamerly | A62B 9/006 |
| 2004/0088780 A1* | 5/2004 | Bachar | A41D 13/00 2/457 |
| 2004/0100384 A1* | 5/2004 | Chen | G07C 9/00111 340/572.1 |
| 2007/0027732 A1* | 2/2007 | Hudgens | G06Q 10/06 705/7.15 |
| 2007/0205903 A1 | 9/2007 | diMarzo et al. | |
| 2010/0194209 A1 | 8/2010 | Richter | |
| 2010/0295660 A1 | 11/2010 | Farioli Brioschi et al. | |
| 2011/0001602 A1 | 1/2011 | Farioli Brioschi et al. | |
| 2012/0001765 A1* | 1/2012 | Boccola | G08B 21/24 340/686.1 |
| 2012/0050668 A1* | 3/2012 | Howell | G02C 11/10 351/158 |
| 2013/0083722 A1* | 4/2013 | Bhargava | H04W 72/085 370/315 |
| 2014/0173439 A1* | 6/2014 | Gutierrez | G08B 21/24 715/727 |
| 2015/0109442 A1* | 4/2015 | Derenne | G08B 21/245 348/143 |
| 2015/0242665 A1* | 8/2015 | Antonescu | G06K 19/0724 340/8.1 |
| 2016/0335505 A1* | 11/2016 | Renkis | G06K 9/00771 |

* cited by examiner

SAFETY EQUIPMENT CRITERIA VERIFICATION

BACKGROUND

This disclosure relates generally to wearable systems, and more specifically, to verifying that a set of safety equipment a person may wear satisfies a set of safety equipment criteria according to his or her given task assignment.

For a given job plan, a worker such as a healthcare worker, technician, equipment engineer, or production worker may be required to wear specific combinations of protective equipment based on safety equipment criteria protocols (e.g., personal protective equipment (PPE) Occupational Safety and Health Administration (OSHA) standards). These workers may be required to wear such protective equipment because of the hazardous environments they work in, which may include pathogenic viruses or bacteria, dangerous pieces of equipment, or toxic chemicals. For example, a nurse or lab technician may be required to wear an apron, protective gloves, and goggles when handling diseased patients or certain chemicals. In another example, an electrician may be required to wear a hard hat and steel-toe boots when on a construction site in order to protect their head and feet from falling debris.

SUMMARY

One or more embodiments are directed to a computer-implemented method for verifying a set of safety equipment criteria. The method can include receiving a first unit of data at a first computing device. The first unit of data may be received via a wireless signal between the first computing device and a set of sensing devices. The first unit of data may identify a set of safety equipment that includes the set of sensing devices. The set of sensing devices may be configured to transmit the first unit of data. The method can also include monitoring the wireless signal between the first computing device and the set of sensing devices and determining that a signal strength for the wireless signal is below a threshold value. Further, the method can include notifying a second computing device, in response to the determining that the signal strength for the wireless signal is below the threshold value.

One or more embodiments are directed to a system for verifying a set of safety equipment criteria. The system can include a processor and a computer readable storage medium having program instructions embodied therewith. The program instructions may be executable by the processor to cause the system to receive a first unit of data at a first computing device. The first unit of data may be received via a wireless signal between the first computing device and a set of sensing devices. The first unit of data may identify a set of safety equipment that includes the set of sensing devices. The set of sensing devices may be configured to transmit the first unit of data. Further, the program instructions may be executable by the processor to cause the system to monitor the wireless signal between the first computing device and the set of sensing devices and to determine that a signal strength for the wireless signal is below a threshold value. Moreover, the program instructions may be executable by the processor to cause the system to notify a second computing device, in response to the determining that the signal strength for the wireless signal is below the threshold value. The program instructions may also be executable by the processor to cause the system to determine, via the first computing device, that the first unit of data does not satisfy a set of safety equipment criteria. The program instructions may be executable by the processor to cause the system to notify the second computing device, in response to the determining that the first unit of data does not satisfy the set of safety equipment criteria;

One or more embodiments are directed to a computer program product for verifying a set of safety equipment criteria. The computer program product includes a computer readable storage medium having program instructions embodied therewith. The program instructions are executable by a first computing device to cause the first computing device to receive a first unit of data. The first unit of data may be received via a wireless signal between the first computing device and a set of sensing devices. The first unit of data may identify a set of safety equipment that includes the set of sensing devices. The set of sensing devices may be configured to transmit the first unit of data. In addition, the program instructions are executable by the first computing device to cause the first computing device to monitor the wireless signal between the first computing device and the set of sensing devices and determine that a signal strength for the wireless signal is not below a threshold value. Moreover, the program instructions are executable by the first computing device to cause the first computing device to notify a second computing device, in response to the determining that the signal strength for the wireless signal is not below the threshold value.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
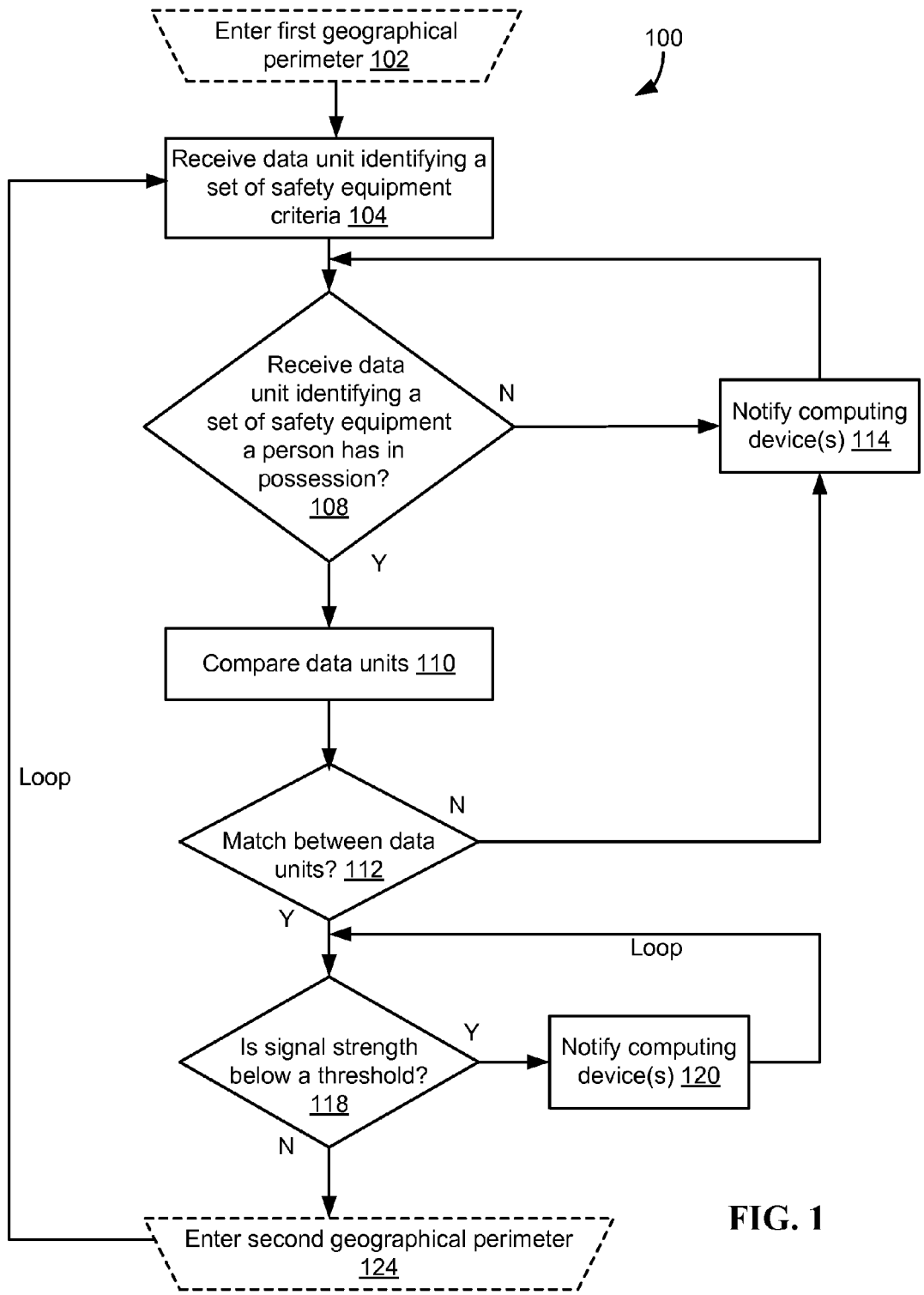
FIG. 1 is a flow diagram of an example process for verifying that a set of safety equipment satisfies a set of safety equipment criteria.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to wearable system, more particular aspects relate to verifying that a set of safety equipment a person may wear satisfies a set of safety equipment criteria according to his or her given task assignment. While the present disclosure is not necessarily limited to such applications, various aspects of the disclosure may be appreciated through a discussion of various examples using this context.

A technician or other skilled worker may perform technical inspection, maintenance, or repair procedures on equipment or assets deployed in an environment. These workers may operate in hazardous environments, on dangerous pieces of equipment, or with toxic chemicals. Corresponding wearable equipment to mitigate the effects of the hazards may be implemented by each worker for a given task. For example, a lab technician handling a toxic chemical may recognize that she needs to wear an apron, protective gloves, and goggles when handling the toxic chemical. Other times, however, a worker may not realize the hazard present for a given task, and may therefore fail to wear the appropriate corresponding safety equipment. For example, a worker may not realize that he or she will be exposed to an unusually high amount of radiant energy produced by welding, which requires that the worker wear a minimum threshold of protective shading in order to protect the eyes from permanent eye damage. Accordingly, the worker may mistakenly wear a face shield with the wrong amount of shading. Further, a job duty may require a worker to wear a very large quantity of safety equipment and consequently it may be difficult for a worker to memorize all of the equipment that is required for the task. Other times, a worker may simply forget to put equipment back on after taking an extended break.

Various embodiments of the present disclosure are therefore directed to a computing device configured to verify a set of safety equipment criteria (e.g., a set of safety equipment that the worker should be wearing for a given task). The phrase "set of" (e.g., safety equipment, safety equipment criteria, sensing devices, etc.) includes one or more, but not zero. The computing device may receive a first unit of data. The first unit of data may be received via a wireless signal between the computing device and a set of sensing devices. The first unit of data may identify a set of safety equipment that includes the set of sensing devices (e.g., a hardhat, boots, and gloves may be the set of safety equipment and a sensor on the hardhat, boots, and gloves may be the set of sensing devices). The set of sensing devices may be configured to transmit the first unit of data. The computing device may further monitor the wireless signal between the computing device and the set of sensing devices and determine that a signal strength for the wireless signal is below a threshold value (e.g., –70 decibels). The computing device may then notify a second computing device, in response to the determining that the signal strength for the wireless signal is below the threshold value.

The computing device may be any suitable device that can be located on the person trying to satisfy a set of safety equipment criteria. For example, the computing device can be a smart phone or other mobile device that a person keeps in his or her pocket. The computing device may also be smart glasses, a smart watch, a portable computer, a laptop or notebook computer, a tablet computer, a pocket computer, a handheld radio, or any other computing device. The computing device may also be embedded in different articles of clothing of a person. For example, the device may be embedded in a bracelet, belt, arm band, head band, or leg band.

In some embodiments, the safety equipment worn to mitigate the effects of particular hazards may be personal protective equipment (PPE). PPE is safety equipment worn to minimize exposure to a variety of hazards. Examples of PPE include eye and face protection (e.g., goggles), head protection (e.g., hard hats), foot and leg protection (e.g., shoes), hand and arm protection (e.g., gloves), body protection, and hearing protection. In some embodiments the set of safety equipment criteria may be based on a PPE requirement protocol. For example, the Occupational Safety and Health Administration (OSHA) may provide the set of safety equipment criteria that each person must conform to in order to wear PPE for his or her task.

FIG. 1 is a flow diagram of an example process 100 for verifying that a set of safety equipment satisfies a set of safety equipment criteria. In some embodiments, the process 100 may begin with operation 102 when a person enters a first geographical perimeter. Geographical perimeters may be any suitable boundary defined by one or more location transmitters. For example, a geographical perimeter may be the walls of a room that include the location transmitters. A location transmitter provides contextual information based on the location of the location transmitter and the receiving computing device receives the contextual information. For example, a location transmitter may provide the computing device a job task that corresponds to the geographical perimeter and a corresponding safety equipment requirement criteria according to the job task. For embodiments of the present disclosure, a computing device (e.g., a mobile phone device) may perform operation 104 to receive a unit of data from a location transmitter once the worker enters a first geographical perimeter. The unit of data may identify a set of safety equipment criteria that a worker must satisfy. In some embodiments, the geographical perimeter may also be a distance threshold (e.g., 10 feet) at which point a location transmitter may transmit the unit of data. For example, if a person was within 10 feet of a location transmitter, and the person had a corresponding computing device in his or her pocket, the location transmitter may have a strong enough signal with the computing device to provide a unit of data at the 10 feet threshold.

In some embodiments, the person may put on a set of safety equipment (e.g., one or more articles of safety equipment such as goggles, an apron, and gloves). The set of safety equipment may include a set of sensing devices (e.g., the goggles, the apron, and the gloves may all include respective sensors). The computing device located on a person may then perform operation 108 to determine whether it has received a unit of data from the set of sensing devices via a wireless signal between the computing device and the set of sensing devices. The unit of data may identify the set of safety equipment that the worker has in possession. If the computing device has not received the unit of data from the set of sensing devices the computing device may perform operation 114 to notify one or more computing devices that the set of safety equipment criteria has not been met. The computing device may poll the set of sensing devices until it receives the data unit. In some embodiments, the computing device may poll for a suitable amount of time (e.g., 2 minutes after it receives the first unit of data identifying safety equipment criteria) before the computing device performs operation 114 to notify multiple computing devices that the set of safety equipment criteria has not been met. In these embodiments, a worker may not have put on any articles of safety equipment at all, which may mean that no sensing devices are providing a unit of data. The computing device may receive the unit of data from the set of sensing devices in various manners. For example, a set of Radio-frequency Identification (RFID) tags, or Near Field Communication (NFC) tags located on the set of safety equipment may provide the unit of data, as described further below. "Possession" may mean that the worker has one or more articles of the set of safety equipment within a threshold distance from the computing device such that the computing device may receive the unit of data identifying the set of safety equipment. The threshold distance may be any suitable distance. For example, the computing device may be 1 foot away from the set of sensing devices before the sensing device provides a unit of data identifying the safety equipment that the person has. In an illustrative example, a person may walk toward a hardhat he or she intends to place on his or her head and as the computing device in a person's pocket arrives at a distance of 2 feet away from a sensing device on the hardhat, the sensing device may consequently provide a unit of data to the computing device identifying the article of safety equipment. This may happen even though the person has not yet placed the safety equipment on his or her person.

In some embodiments, if the computing device receives the data unit identifying the safety equipment the person has in possession (operation 108), the computing device may then perform operation 110 to compare the data units that both the location transmitter and sensing devices on the safety equipment have transmitted to the computing device. In some embodiments, the computing device may perform operation 112 to determine whether the unit of data identifying a set of safety equipment that the person has in possession to wear matches the unit of data provided by the location transmitter that identifies the set of safety equipment criteria (e.g., whether the set of safety equipment satisfies the set of safety equipment criteria), which is described in more detail below in FIG. 3. A failure to match between the data units may indicate that the person does not have in possession (or is wearing) one or more articles of safety equipment that the person should have in possession for engaging in a corresponding task. For example, a worker may have placed a class C hardhat on his or her head instead of a class A hardhat needed for the task. If there is no match, the computing device may perform operation 114 to notify the computing device of the person or even a supervisor or co-worker (e.g., via a text message to multiple mobile devices) specifying that the person is not in compliance with safety equipment criteria for a given task, as described more below. As soon as the person is notified that he or she is not in compliance with the safety equipment criteria, he or she may put on new and appropriate safety equipment for the given task to try and satisfy the safety equipment criteria. Operations 108, 110, and 112 may then be performed a second time to again verify that the set of safety equipment satisfies the set of safety equipment criteria.

In some embodiments, if the person satisfies the set of safety equipment criteria (e.g., there is a match between data units in operation 112), the computing device of the person may perform operation 118 to monitor the wireless signal between the computing device and the set of sensing devices. This may be done to determine whether a signal strength for the wireless signal is below a threshold value (operation 118). Operation 118 may be performed to verify that the person does not keep any article of safety equipment of the set of safety equipment too far away from the computing device. For example, a worker may have a computing device in his or her pocket and be wearing a hardhat, steel-toe shoes, and gloves (each with sensing devices) to perform a given task. At one point a worker may stop performing the task and remove the gloves. If the worker resumes the task, he or she may forget to place the gloves back on. The worker may accordingly walk a particular distance away from the gloves, such as 4 feet to resume work duties with no gloves on his or her hands. At 4 feet, a signal strength may fall below a threshold value (e.g., −80 db) between the computing device that is on the worker and the sensing device that is on the glove. At this point and time, the computing device may emit an audible feedback alert to the worker to notify the worker that the gloves are not on. Further, the computing device may notify multiple devices and entities using the various techniques described below.

If the signal strength is below a threshold, then an inference may be made that the computing device is at a relatively far distance from one or more articles of the set of safety equipment, thereby indicating that the person has removed the one or more articles of the set of safety equipment, or has forgotten to place the equipment back on after an extended break. Consequently, as part of operation 120, the computing device may notify multiple devices (e.g., the mobile device of the person who took off the safety equipment via alarm or the mobile device of a supervisor via text etc.) indicating that the person may not be wearing the recommended safety equipment. In embodiments, the person may then locate the equipment he or she has removed and put the equipment back on his or her person. In various embodiments, when the person finishes his or her given task within the first geographical perimeter, he or she may take off the safety equipment, and enter a second geographical perimeter for operation 124. The second geographical perimeter may correspond to a different work task in a different environment. Accordingly, the person may be required to satisfy different safety equipment criteria to perform the different work task. Operations 104, 106, 108, 110, 112, 114, 116, 118, 120, and 122 may then be repeated for working in the second geographical perimeter.

Figure 2:
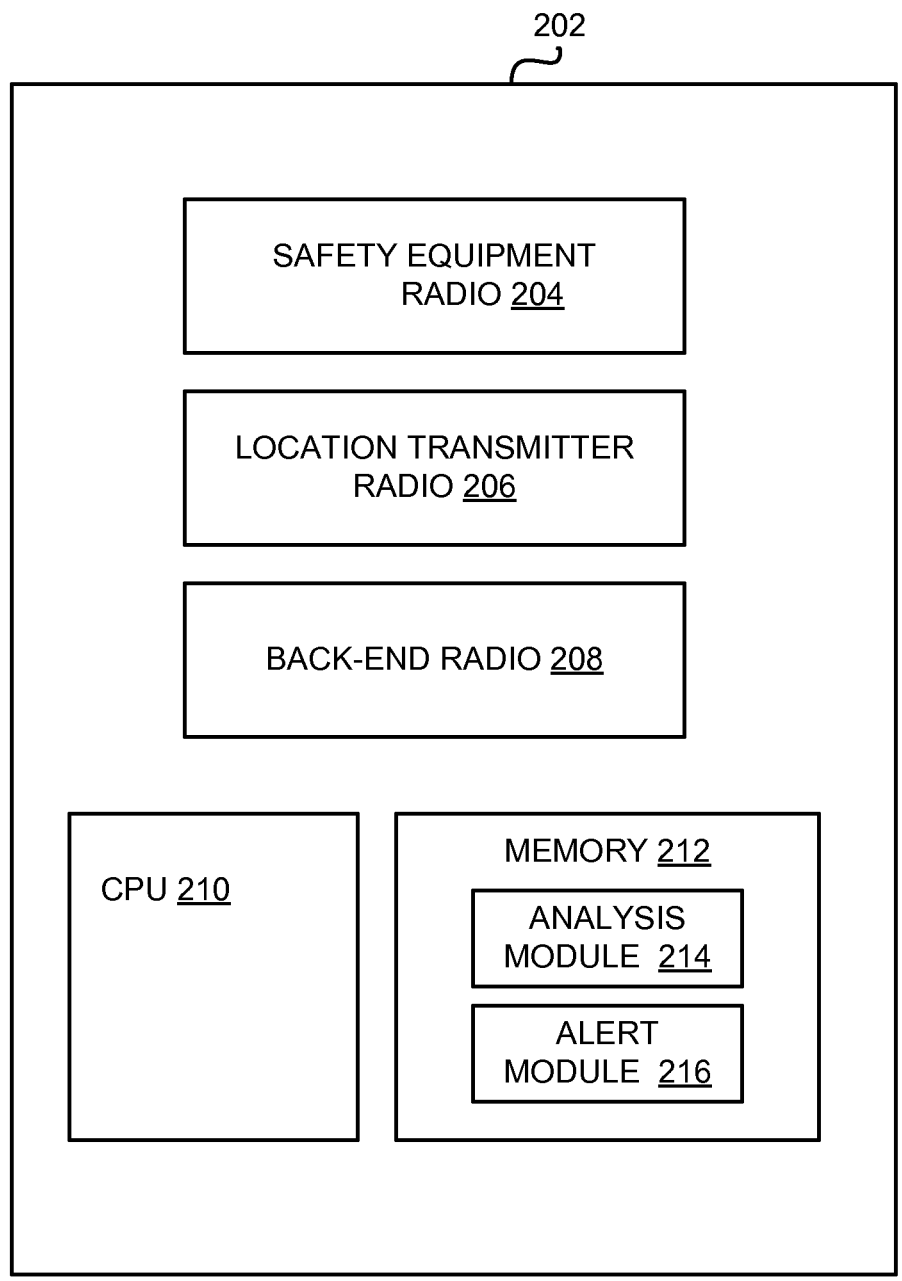
FIG. 2 is a block diagram of an example computing device and the components and data that may reside therein.

FIG. 2 is a block diagram of an example computing device and the components and data that may reside therein. The computing device 202 may include a safety equipment radio 204, a location transmitter radio 206, a back-end radio 208, a central processing unit 210, and a memory 212. The memory 212 may include an analysis module 214 and alert module 216. In some embodiments, however, the computing device 202 may only include a single radio for performing the functions of the safety equipment radio 204, the location transmitter radio 206, and the back-end radio 208. In various embodiments, the computing device 202 may include microphones, sensors, displays, and speaker components or any other suitable component for performing various functions of the present disclosure.

The safety equipment radio 204 may be utilized to communicate with the set of sensing devices located on the safety equipment. In embodiments, the safety equipment radio 204 may include an antenna, reader, and transmitter to read and transmit messages to the safety equipment sensing devices. In various embodiments, the sensing devices located on the safety equipment may be low-power sensors. For example, the sensing devices may be passive, such as a Radio-frequency Identification (RFID) tag, or Near Field Communications (NFC) tag. Alternatively, the tag may be active such as a Bluetooth Low Energy (BLE) tag. The corresponding safety equipment radio 204 readers may also be RFID, NFC, or BLE readers. In some embodiments, one or more articles of the set of safety equipment for a given task may include non-identical tags (e.g., one RFID tag and one BLE tag). Accordingly, the computing device 202 may be an orchestrator such that the computing device may read the different tags.

In an illustrative example, a safety equipment radio 204 may employ an RFID reader to first transmit a radio signal to interrogate a passive RFID tag located on the safety equipment. In embodiments, the passive RFID tag may rely on a magnetic field created by the safety equipment transmitter 204 reader. The magnetic field may induce a current to the RFID tag circuit such that the RFID tag provides a unit of data to the computing device located on the person. This may identify an article of safety equipment the person is in possession of. For example, a person may place a class A hardhat on his or her head, and shortly thereafter, the sensing device on the safety equipment may send a unit of data to a mobile device of the person, indicating that the type of hardhat the person has in his or her possession is a class A hardhat. In some embodiments, the safety equipment radio 204 transmitter may also perform operation 114 and 120 of FIG. 1 to notify one or more devices (e.g., mobile devices of one or more workers) that the worker is not satisfying the safety equipment criteria or that the signal strength between the worker computing device 202 and the safety equipment sensing device is below a threshold.

The location transmitter radio 206 may be utilized to communicate with a location transmitter. For example, the location transmitter may be a beacon, BLE enabled device, or other indoor positioning system transmitter that provides a unit of data to the location transmitter radio 206. The unit of data may identify the set equipment the person should be wearing (e.g., the set of safety equipment criteria) based on his or her assigned tasks or location. In an illustrative example, a worker may enter a first geographical perimeter (e.g., walls of a building). The building may include several beacons that include BLE tags. The geographical perimeter may correspond to a specific job task, such as lab work and the BLE tag may include data concerning the lab work job tasks and safety equipment, such as goggles, gloves, and apron. As soon as the person with the computing device 202 enters the geographical perimeter, a BLE reader within the location transmitter radio 206 may interrogate the BLE tag within the beacon. The BLE tag may then send a unit of data to the location transmitter radio 206 BLE reader to provide the computing device 202 information concerning what tasks the worker should be engaged in and the goggles, gloves, and apron the worker should be wearing (e.g., the set of safety equipment criteria). A person may accordingly read what job tasks he or she should be performing and what safety equipment should be worn.

In some embodiments, the back-end radio 208 may be utilized to communicate with one or more back-end services (e.g., server computing devices or servers). Accordingly, the back-end radio 208 may receive a unit of data from a server computing device. The unit of data may identify a work task that the worker will engage in. In some embodiments, a second server device may transmit a unit of data to the back-end radio 208 such that the unit of data further provides the set of safety equipment criteria. One or more server devices may then determine the set of safety equipment based on the unit of data that identifies the given work task.

In some embodiments, a worker may register his or her intent (e.g., specify through texting, voice activation on the worker's mobile computing device, etc.) to a work-scheduler application of the computing device 202 that he or she is about to perform a particular job task. In an example illustration, the worker 502 may start a work order in a work order management system. The back-end radio 208 may then transmit this information to a corresponding work order service server computing device. The work order service server computing device may then communicate to a safety service server computing device to notify the safety service of what particular job task the worker will engage in. A safety service may keep track of all the safety equipment criteria requirements for each stage of particular job tasks that a worker performs. The safety service server computing device may then transmit a signal to the back-end radio 208 such that the worker and computing device 202 may be aware of the safety equipment requirements that correspond to the particular job tasks. In some embodiments, the safety equipment requirement information may be stored on local databases to the person registering his or her intent to perform the job task. In various embodiments, there may be a single service server computing device that receives the job task information from the back-end radio 208. The single service server computing device may be aware of all of the required safety equipment for the job task, and may send the corresponding list of required safety equipment to the back-end radio 208. In some embodiments, a local database or one or more service server computing devices may send the worker information concerning the exact tasks that the worker has to perform and the corresponding required safety equipment, as opposed to only the list of required safety equipment.

The computing device 202 may include one or more general-purpose programmable central processing units (CPUs) 210. Each CPU 210 executes instructions stored in the memory 212. In embodiments, the computing device 202 may contain multiple CPUs 210. In some embodiments, the computing device 200 may be a single CPU 210 device.

Consistent with some embodiments, the memory 212 may include a random-access semiconductor memory, storage device, or storage medium (either volatile or non-volatile) for storing or encoding data, programs, and instructions that are executed by the CPU 210. For example, the memory 212 may store an analysis module 214 and an alert module 216. The analysis module 214 may be configured to determine whether the unit of data identifying a set of safety equipment a person may wear satisfies a set of safety equipment criteria as described herein. The alert module 216 may be configured to notify one or more computing devices when the unit of data does not satisfy the set of safety equipment criteria and/or when a signal strength between the computing device and the set of sensing devices is below a threshold value. The alert module 216 may also be configured to notify one or more computing devices when the unit of data satisfies the set of safety equipment criteria and/or when the signal strength between the computing device and the set of sensing devices is not below the threshold value. In embodiments, the analysis module 214 and alert module may be a single module.

In an example, the alert module 216 may be configured to locate a list of predetermined mobile phone numbers stored in the memory 212. The predetermined mobile phone numbers may correspond to the mobile phones of a supervisor or other co-workers. Accordingly, the computing device 202 may utilize the analysis module 214, the alert module 216, and one or more radios to notify the mobile phones that correspond to the phone numbers stored in the memory 212. In some embodiments, a location transmitter application program may be stored in the memory 212. In an illustrative example, a location transmitter (e.g., a beacon) may provide a unit of data to the location transmitter radio 206, and the location radio 206 may direct the unit of data to the location transmitter program stored in the memory 212, such that a user may open the location transmitter program application and receive a unit of data identifying a set of safety equipment criteria. In another example, one or more sensing devices located on or more articles of the set of safety equipment that a worker has in possession may provide a unit of data to the safety equipment radio 204, and the safety equipment radio 204 may direct the unit of data to a safety equipment program stored in the memory 212, such that a worker may open the safety equipment program application and determine what exactly the worker has in possession to be worn. In other examples, the memory 212 may store a work order service or safety service program such that when a worker registers his or her intent on the work order service or safety service program application, he or she may be able to read the corresponding required safety equipment criteria on the work order service or safety service program so that the worker knows what safety equipment he or she should be wearing.

In embodiments, the memory 212 represents the entire virtual memory of the computing device 202, and may also include the virtual memory of other computer systems coupled to the computing device 202 or connected via a network. The memory 212 may be a single monolithic entity, but in some embodiments the memory 212 may include a hierarchy of caches and other memory devices. For example, memory 212 may exist in multiple levels of caches, and these caches may be further divided by function, so that one cache holds instructions while another holds non-instruction data, which is used by the processor. Memory 212 may be further distributed and associated with different CPUs 210 or sets of CPUs 210, as is known in any various so-called non-uniform memory access (NUMA) computer architectures.

Figure 3:
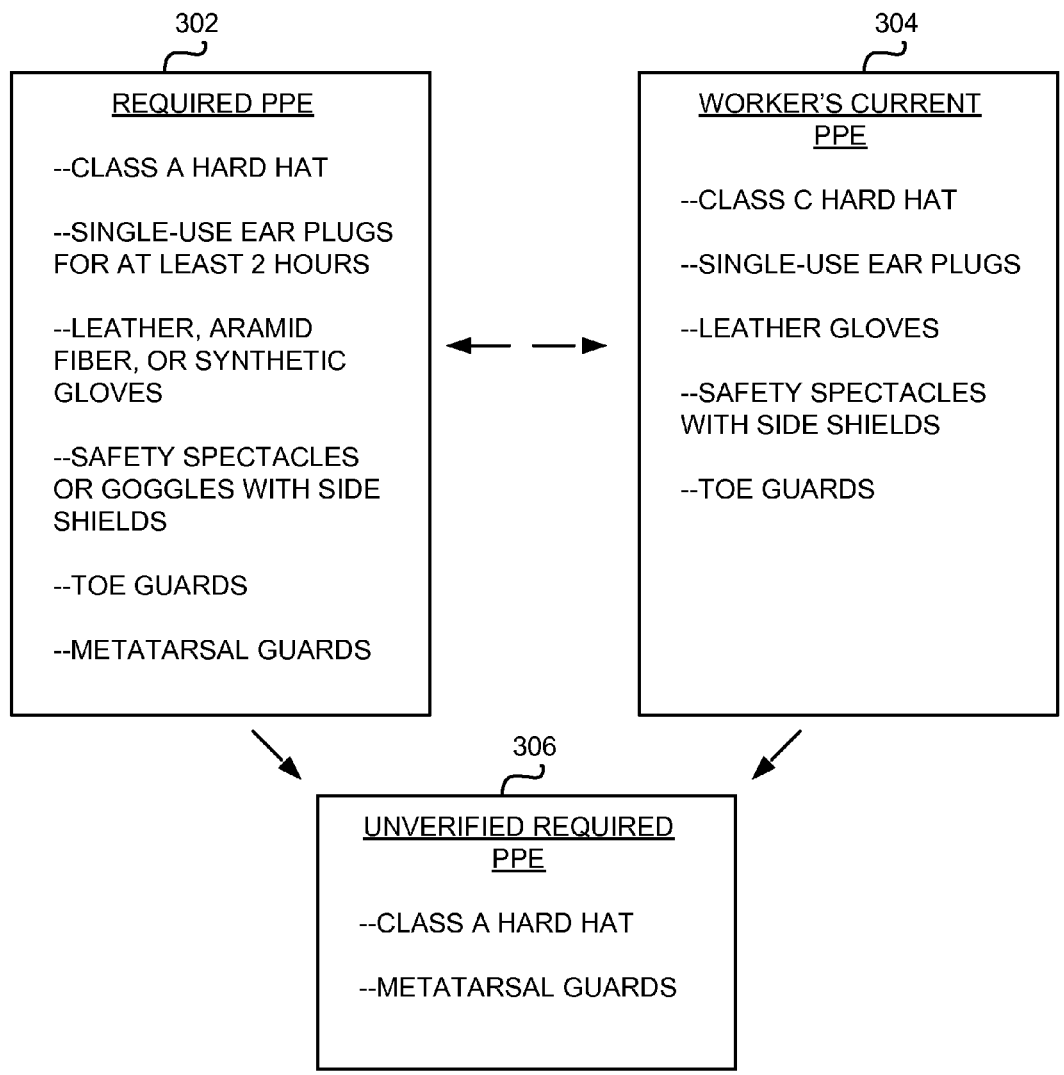
FIG. 3 is an example diagram of how a computing device may determine that a set of safety equipment does not satisfy a set of safety equipment criteria.

In various embodiments, after the computing device 202 receives data units from a set of sensing devices on the set of safety equipment identifying what safety equipment a person has in possession, and receives data units from a location transmitter or back-end service identifying the safety equipment criteria, the computing device 202 may compare the data units as described herein. FIG. 3 is an example diagram of how a computing device 202 may determine that set of safety equipment does not satisfy a set of safety equipment criteria. In various embodiments, processes identified in FIG. 3 may be performed by the analysis module 214 of FIG. 2. In some embodiments, processes identified in FIG. 3 may be performed by one or more server computing devices. In the example of FIG. 3, the set of safety equipment criteria is based on PPE protocols. A computing device 202 may receive a first unit of data 302 identifying the required PPE set of safety equipment criteria. The computing device 202 may also receive a second unit of data 304 from a set of sensing devices identifying the set of safety equipment that the worker has in his or her possession to wear. The computing device 202 may then compare the data units, as specified in operation 110 in FIG. 1, and determine the unverified PPE 306 from the first unit of data 302 (e.g., determining that the second unit of data that identifies safety equipment that a person may wear does not satisfy the safety equipment criteria). In other words, there is no match between the first and second data units.

In the illustrative example of FIG. 3, the first unit of data 302 identifying required PPE safety equipment criteria may include the following articles of protective safety equipment: class A hardhat, single-use ear plugs that should be worn for at least 2 hours because the sound level may be at 2 decibels, leather, aramid fiber, or synthetic gloves, safety spectacles or goggles with side shields, toe guards, and metatarsal guards. The second unit of data 304, which demonstrates what articles of safety equipment of the set of safety equipment the worker is in possession of for wearing may include the following: class C hardhat, single-use earplugs, leather gloves, safety spectacles with side shields, and toe guards. In this illustrative embodiment, each article of safety equipment of the set of safety equipment (e.g., class C hardhat, single-use ear plugs, leather gloves, safety spectacles, toe guards) includes a sensing device that transmits a sub-unit of data to the computing device to provide the computing device with the article's identity. For example, if the safety equipment sensing devices are NFC tags, a worker may first place a toe guard on his or her shoe. The toe guard may include an NFC tag embedded in the toe guard. The worker may then move his or her computing device 202 in front of the toe guard NFC tag. The NFC tag may then provide a sub-unit of data to the computing device identifying that the worker is currently in possession of the toe guard (e.g., the worker intends to wear the toe guard). This process may be repeated for every article of equipment of the set of safety equipment that the worker puts on. All of the sub-units of data that the set of sensing devices sends to the computing device makes up the second unit of data 304.

In embodiments, after comparing the first unit of data 302 and the second unit of data 304, a computing device may determine the unverified required PPE 306. In the illustrative example of FIG. 3, the unverified PPE may include the class A hardhat and metatarsal guards. In this example, the worker may have accidently placed the wrong type of hardhat on. The second unit of data 304 indicates that the worker registered a class C hardhat instead of a class A hardhat. The worker may also have forgotten to place the required metatarsal guards on his or her feet, perhaps thinking that the toe guards were sufficient for the job task. In some embodiments, after the computing device determines the unverified PPE, the computing device may notify the person with unverified PPE by generating an alert dialog on the computing device for display on the computing device indicating which articles of the set of safety equipment the worker does not satisfy the safety equipment criteria. The computing device may also notify multiple devices that that the worker has not registered required PPE, as specified in operation 114 of FIG. 1.

Figure 4:
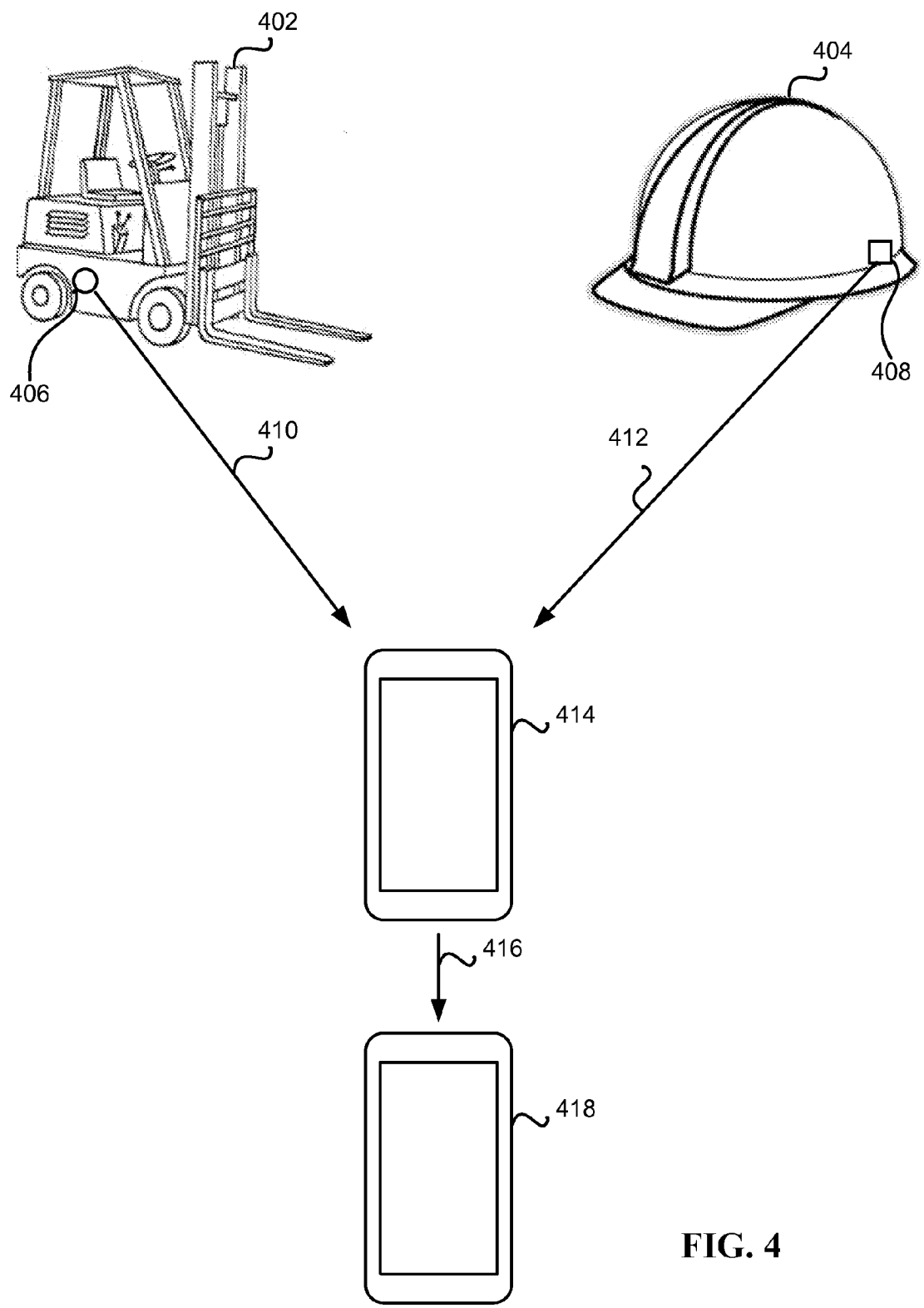
FIG. 4 is an example diagram showing an abstract illustration of how data units are transmitted from both a sensing device on an article of safety equipment and a location transmitter to a computing device, and how the computing device may notify other devices if there is no match between the data units.

FIG. 4 is an example diagram showing an abstract illustration of how data units are transmitted from both a sensing device on an article of safety equipment and a location transmitter to a computing device, and how the computing device may notify other devices if there is no match between the data units. In this illustration, a forklift 402 may include a location transmitter 406. The location transmitter 406 may transmit a signal 410 that includes a first unit of data to the computing device 414. The first unit of data may identify a set of safety equipment criteria a worker should satisfy in order to work with the forklift 402. A hardhat 404 may include a sensing device 408 that also sends its own signal 412 to the computing device 414. The signal may include a second unit (or sub-unit) of data identifying that the article of safety equipment the worker has in possession is a hardhat 404. In various embodiments, the computing device 414 may then compare the first and second units of data from the sensing device 408 and the location transmitter 406 to determine if the article of safety equipment satisfies the corresponding safety equipment criteria. If the computing device 414 determines that the article of equipment does not satisfy the corresponding safety equipment criteria, the computing device 414 may sound an alarm or transmit an alert signal 416 to another second computing device 418 (e.g., a mobile phone of another worker) indicating that the worker may not be wearing or in possession of the appropriate safety equipment for the given task because there is no match between the first and second units of data.

The article of safety equipment is illustrated as a hardhat 404 in FIG. 4. However, the articles of safety equipment may be any suitable article of safety equipment that may include a sensing device. For example, the articles of equipment may be any type of eye and face protection equipment (e.g., goggles, safety spectacles, prescription lenses, face shields), head protection equipment, foot and leg protection equipment (e.g., special purpose shoes, foundry shoes, protective footwear such as toe or metatarsal guards), hand and arm protection equipment (e.g., leather, fabric, or canvas gloves), body protection equipment (e.g., apron), and hearing protection equipment.

The unit of equipment that includes the location transmitter 406 is illustrated as a forklift 402 in FIG. 4. However, the unit of equipment may be any suitable unit of safety equipment that a worker does his or her job with that is capable of including a location transmitter. For example, the unit of equipment may be a microscope, x-ray machine, hospital bed, tractor, operating mill, various factory-implemented pieces of equipment, or any other suitable pieces of equipment that helps a person perform a given work task.

The second computing device 418 is illustrated in FIG. 4 as being a smart phone. However, the device 418 (and computing device 414 as mentioned above) may be any suitable device that can be located on a person. For example, the device 418 can be another mobile device, smart glasses, smart watch, portable computer, laptop or notebook computer, tablet computer, pocket computer, handheld radio, or any other computing device. The device 418 may also be embedded into different articles of clothing of a person. For example, the device 418 may be embedded in a bracelet, belt, arm band, head band, or leg band.

The computing device 414 may propagate an alert signal 416 or provide feedback to notify one or more devices through various embodiments. For example, if a computing device 414 determines that the safety equipment a worker has in possession does not satisfy the safety equipment criteria, then the computing device 414 may provide a feedback notification by utilizing an application program located on the computing device 414 to generate an alert dialog or screen to notify the worker that he or she is not wearing the appropriate safety equipment. In one or more embodiments, the notification may be a push notification to a smartphone. In various embodiments, the computing device 414 or other back-end service may transmit a short message service (SMS) text message to the computing device 414 or other secondary computing devices 418. In some embodiments, the computing device 414 may transmit an audio signal to a radio device coupled to equipment of the set of safety equipment a person works with. For example, a set of safety equipment may include the forklift 402 and the hardhat 404 for a given task. If the computing device 414 determines that the hardhat 404 (e.g., equipment from the set of safety equipment) that the worker has registered does not satisfy the safety equipment criteria, the computing device 414 may transmit an audio alert signal 416 to a radio device on the forklift 402. The alert signal 416 may notify one or more workers that a particular worker is not wearing or in possession of the appropriate safety equipment. In some embodiments, the radio device may include a display screen such that the notification from the computing device may be a visual signal that indicates which worker is not wearing or in possession of the appropriate safety equipment. In embodiments, the computing device 414 may be the device that transmits a worker ID to one or more devices when a notification is issued to inform one or more person concerning which worker is not wearing or in possession of the appropriate equipment for a given task.

In embodiments, the computing device 414 may notify one or more secondary computing devices by transmitting the alert signal 416 back to the sensing device 408 to vibrate the safety equipment, which may indicate that the worker is not in possession of or wearing the required safety equipment. In some embodiments, the hardhat 404 may include a set of LEDs. In an example, the alert signal 416 may be transmitted to the sensing device 408 on the hard hat 404 to change the state or color of light-emitting diodes (LEDs). When the computing device 414 compares the two units of data of what safety equipment the worker has in possession versus what the safety equipment criteria is, and sees that there is unverified safety equipment not registered (e.g., the wrong type of hardhat is being worn), the computing device 414 may send an alert signal 416 to a sensing device 408 of the hardhat 404. The sensing device 408 may be configured to change the LED color from green to red on the hardhat 408, which may indicate that the worker' hardhat 408 does not satisfy a safety equipment criterion. In an alternative example, if the computing device 414 determines that there is no unverified protective equipment (e.g., the worker is wearing the appropriate hardhat 408), then the computing device may send an alert signal 416 to notify a sensing device 408. The sensing device 408 may be configured to change or initiate a color sequence of green LEDs to indicate that the worker's hardhat 408 meets a safety equipment criterion. In this example, after a worker puts on a set safety equipment, he or she may simply look to see what color the LEDs are to notify the worker of the appropriate safety equipment worn or not worn. For example, a worker may look at her protective boot, hardhat, and goggles and see that all of the respective LEDs are green. The worker may notice that her glove sensing device has a red LED. Accordingly, the worker may then be aware that she needs to take off the gloves and put on appropriate gloves.

In various embodiments, multiple secondary computing devices 418 and corresponding entities may be notified when the computing device 414 determines that a worker is satisfying or not satisfying the set of safety equipment criteria. For example, the secondary computing devices 418 that may be alerted may be mobile phone devices of a co-worker, supervisor, back-end service, or any other entity. In various embodiments, these secondary computing devices 418 may be alerted at substantially the same time or at different times. Further, one or more entities may be alerted together or some may not be alerted at any time.

Consistent with some embodiments, a computing device 414 may monitor a wireless signal between the computing device 414 and a set of sensing devices and determine whether a signal strength for the wireless signal is below a threshold value. The computing device 414 may notify a second computing device 418 (which may be the computing device 414) in response to the determining that the signal strength for the wireless signal is below a threshold value. The monitoring may be performed to verify that the person does not remove the recommended safety equipment. In an example, the monitoring may include the computing device 414 polling the set of sensing devices (e.g., every five seconds) to continually receive a set of data indicating the safety equipment a person has in possession. If the signal strength is below a threshold, then an inference may be made that the computing device 414 is at a relatively far distance from the one or more articles of the set of safety equipment, thereby indicating that the person has removed the one or more of the articles of the set of safety equipment. In various embodiments, the threshold value signal strength at which point the computing device 414 notifies one or more devices 418 may be any suitable threshold. For example, the threshold value may be any value below −70, −80, or −90 decibels (db) in a received signal strength (RSSI) range. The signal strength may alternatively be measured in decibel-milliwatts (dbm), or any other appropriate unit measurement. Moreover, any suitable standards other than RSSI may be utilized, such as received channel power indicator (RCPI). Each threshold signal strength value may correspond to a distance at which a computing device 414 reader is from a sensing device 408, such 3 feet, 5 feet, 10 feet or any corresponding value.

Figure 5:
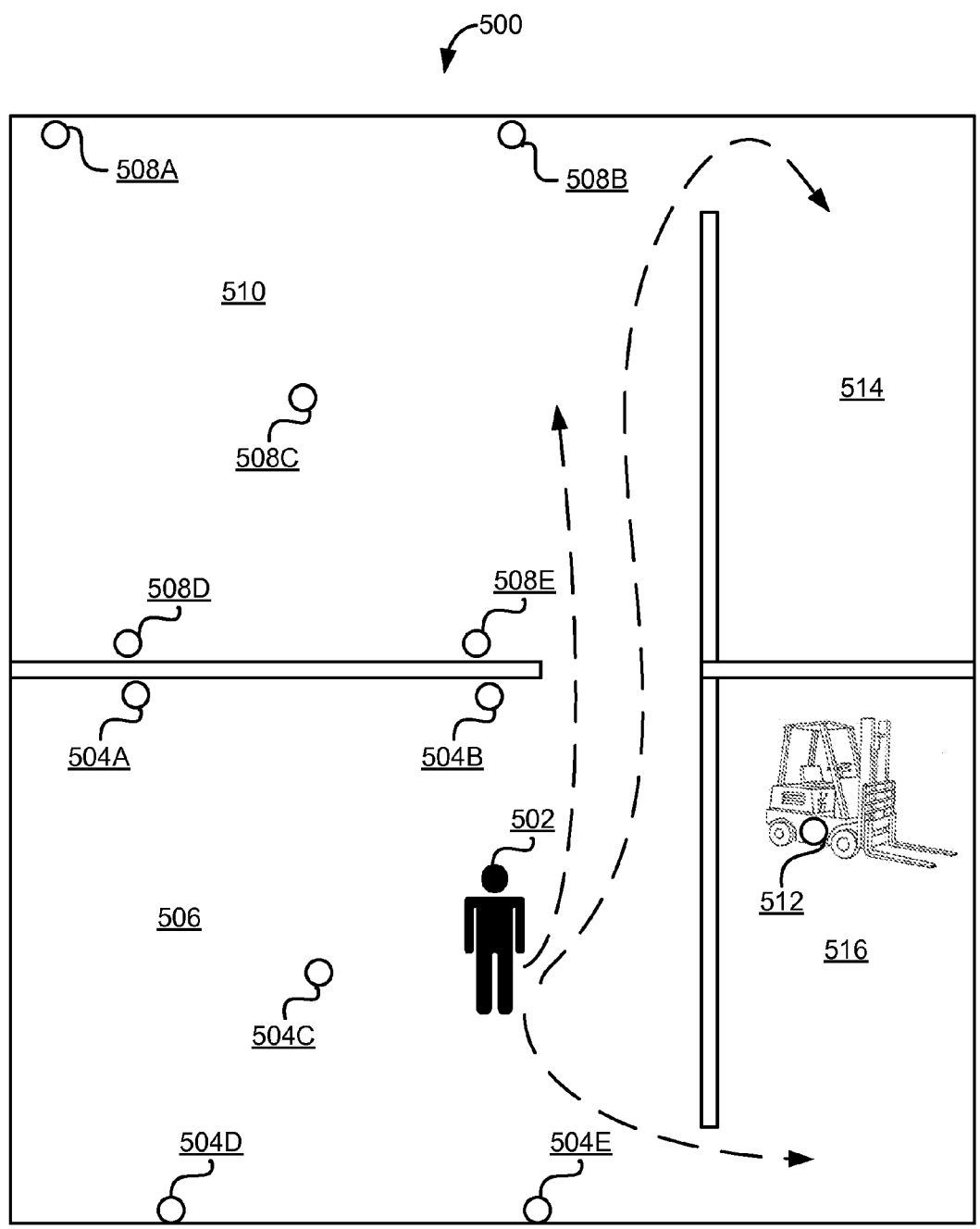
FIG. 5 is a top view diagram of a working environment that includes different geographical perimeters that may correspond to various work tasks and corresponding protective safety equipment criteria according to the work tasks.

FIG. 5 is a top view diagram of a working environment 500 that includes different geographical perimeters that may correspond to various work tasks and corresponding protective safety equipment criteria according to the work tasks. The working environment 500 may be a building that includes 4 rooms 506, 510, 514, and 516. The 4 rooms may correspond to 4 different geographical perimeters. The geographical perimeters may be any suitable boundary defined by the location transmitters (e.g., room 506 is defined by the plurality of location transmitters 504A, 504B, 504C, 504D, and 504E). For example, the geographical perimeter may be located outdoors with corresponding location transmitters on walls or pieces of equipment. In another example, a geographical perimeter may be a sub-section of the room 506. For example, the upper portion of the room 506 may be utilized for a first work task and include a first set of location transmitters 504A and 504B that transmit to the worker's computing device concerning the set of safety equipment criteria that should be satisfied for the first work task. The lower portion of the room 506 may be utilized for a second work task and include a second set of location transmitters 504D and 504E that transmit to the worker's computing device concerning the set of safety equipment criteria that should be satisfied for the second work task.

Room 506 may include a plurality of location transmitters 504A, 504B, 504C, 504D, and 504E. Each location transmitter may be located in any suitable location, such as on building ceilings, floors, walls or other articles of equipment. Room 506 may also include one or more workers 502 that are wearing safety equipment. Room 510 may also include a set of location transmitters 508A, 508B, 508C, 508D, and 508E. Room 514 may not include any location transmitters. Room 516 may include equipment of the set of safety equipment that the worker will be working with (e.g., forklift) and equipment may include a location transmitter 512.

In an illustrative example, the worker 502 may enter a first room 506 (e.g., first geographical perimeter as specified in operation 102 of FIG. 1) that corresponds to a first work task. Location transmitters 504A, 504B, 504C, 504D, and 504E may then transmit a signal to the worker's computing device to provide a first unit of data to the computing device, which identifies a set of safety equipment criteria (e.g., PPE protocols). Within the room 506 the worker 502 may then put on the desired safety equipment. Each article of safety equipment may include sensing devices that provide a second unit of data to the worker's 502 computing device, which may identify the safety equipment the worker 502 may have in possession to wear. The computing device may then determine whether the first unit of data matches the second unit of data (e.g., whether the safety equipment that the person has on satisfies the set of safety equipment criteria). The worker 502 may then proceed to perform his or her work task in room 506. After the worker 502 finishes his or her work task in room 506, he or she may remove the corresponding safety equipment.

In embodiments, the worker 502 may then enter a second room 510 (e.g., second geographical perimeter as specified in operation 124 of FIG. 1), which may correspond to a second work task. Location transmitters 508A, 508B, 508C, 508D, and 508E may then transmit a signal to the worker's 502 computing device to provide a third unit of data to the computing device, which identifies the set of safety equipment criteria the worker 502 should satisfy for the second work task. Within the room 510, the worker 502 may then put on the desired safety equipment. Each article of safety equipment may include a set of sensing devices that provide a fourth unit of data to the worker's 502 computing device, which may identify the safety equipment the worker 502 has in possession or is wearing. The computing device may then compare and verify that the data units match. The worker 502 may then proceed to perform his or her second work task in room 510. After the worker 502 finishes his or her work second task in room 510, he or she may remove the corresponding safety equipment.

In some embodiments, the worker 502 may enter room 514 that does not include location transmitters. In this embodiment, the worker 502 may register his or her intent (e.g., specify through texting) to a work-scheduler application of the computing device 202 that he or she is about to perform a particular job task. For example, the worker 502 may start a work order in a work order management system. The computing device may then transmit this information to a corresponding work order service server computing device. The work order service server computing device may then communicate to a safety service server computing device to notify the safety service of what particular job task the worker 502 will engage in. The safety service may keep track of all the safety equipment requirements for each stage of particular job tasks that a worker 502 performs. The safety service may then transmit a signal to the computing device such that the worker 502 and computing device may be aware of the safety equipment requirements that correspond to the particular job tasks to be done in room 514. Each article of safety equipment may include sensing devices that provide a unit of data to the worker's 502 computing device, which may identify the safety equipment the worker 502 has in his or her possession to wear. The computing device may then determine whether the set of safety equipment satisfies the set of safety equipment criteria. The worker 502 may then proceed to perform his or her work task in room 514. After the worker 502 finishes his or her work task in room 514, he or she may remove the corresponding safety equipment.

In various embodiments, the worker 502 may enter room 516, which includes at least one location transmitter 512 coupled to one or more units of equipment of the set of safety equipment that the worker 502 will be working with (e.g., a forklift) In this embodiment, after the worker 502 enters the room 516, the location transmitter 512 may transmit a signal to the worker's computing device to provide a unit of data to the computing device, which identifies a set of safety equipment criteria. For example, the first unit of data may specify that in order to work with the forklift, the worker may need a particular hardhat, goggles, and steel-toe shoes. Within the room 516, the worker 502 may then put on the corresponding hardhat, goggles, and steel-toe shoes. The hardhat, goggles, and steel-toe shoes may include sensing devices that provide a unit of data to the worker's 502 computing device, which may identify the safety equipment the worker 502 has in possession to wear. The computing device may then determine whether the set of safety equipment satisfies the set of safety equipment criteria. The worker 502 may then proceed to perform his or her work task in room 516. After the worker 502 finishes his or her work task in room 506, he or she may remove the corresponding safety equipment.

The present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for verifying a set of safety equipment criteria comprising:
   receiving a first unit of data at a first mobile computing device, the first unit of data received via a wireless signal between the first mobile computing device and a set of sensing devices, the first unit of data identifying a set of safety equipment that includes the set of sensing devices, the set of sensing devices configured to transmit the first unit of data;
   receiving, over a network and from a remote server associated with a first set of location beacon transmitters, a second unit of data at the first mobile computing device, the second unit of data identifying a set of safety equipment criteria, the first set of location beacon transmitters being located within a first geographical perimeter, the first geographical perimeter including the set of safety equipment, wherein a second set of location beacon transmitters are located within a second geographical perimeter that includes another set of safety equipment, the first geographical perimeter and the second geographical perimeter being within a same building;
   determining at the first mobile computing device, by comparing the first unit of data with the second unit of data, whether the set of safety equipment satisfies the set of safety equipment criteria;
   monitoring the wireless signal between the first mobile computing device and the set of sensing devices and determining that a signal strength for the wireless signal is below a threshold value, the signal strength for the wireless signal being below the threshold value corresponding to a person removing one or more articles of the set of safety equipment; and
   notifying a second computing device, in response to the determining that the signal strength for the wireless signal is below the threshold value and based on whether the set of safety equipment satisfies the set of safety equipment criteria.

2. The method of claim 1, further comprising:
   determining, via the first mobile computing device, that the first unit of data does not satisfy the set of safety equipment criteria; and
   notifying the second computing device, in response to the determining that the first unit of data does not satisfy the set of safety equipment criteria.

3. The method of claim 2, wherein the notifying of the second computing device includes transmitting a signal to a radio device coupled to a unit of equipment that is needed for a person to perform a work task with, the person carrying the first mobile computing device, and wherein the signal causes an alert indicating that the person is not meeting the set of safety equipment criteria to work with the unit of equipment, wherein the unit of equipment is not the set of safety equipment and is not wearable.

4. The method of claim 2, wherein the set of safety equipment criteria is based on a personal protective equipment (PPE) requirement protocol.

5. The method of claim 2, wherein the first mobile computing device is the second computing device.

6. The method of claim 1, further comprising:
   receiving, over the network and from the remote server, a third unit of data at the first mobile computing device, the third unit of data identifying a work task that must be performed; and
   determining what the set of safety equipment criteria includes based on the work task.

7. The method of claim 1, wherein the notifying of the second computing device includes transmitting an audio signal to a radio device coupled to an apparatus that a person wearing the set of equipment must use to perform a given job task.

8. A system for verifying a set of safety equipment criteria comprising:
   a processor and a first computing device; and
   a computer readable storage medium having program instructions the program instructions executable by the processor to cause the system to:
   receive, from a first location beacon transmitter within a first geographical perimeter, a first unit of data at the first computing device, the first unit of data received via a first wireless signal between the first computing device and a first set of sensing devices, the first unit of data identifying a first set of safety equipment that includes the first set of sensing devices, the first set of sensing devices configured to transmit the first unit of data, the first computing device being a mobile device, the first unit of data including information about a first work task to be performed within the first geographical perimeter;
   monitor, via the first computing device, the first wireless signal between the first computing device and the first set of sensing devices and determining that a signal strength for the first wireless signal is not below a threshold value;
   determine, via the first computing device, that the first unit of data satisfies the first set of safety equipment criteria;
   receive, from a second location beacon transmitter within a second geographical perimeter, a second unit of data at the first computing device, the second unit of data received via a second wireless signal between the first computing device and a second set of sensing devices, the second unit of data identifying a second set of safety equipment that includes the second set of sensing devices, the second set of sensing devices configured to transmit the second unit of data, the second unit of data including information about a second work task to be performed within the second geographical perimeter;
   determine, via the first computing device, that the second unit of data does not satisfy the second set of safety equipment criteria; and
   notify, via the first computing device, a second computing device, in response to the determining that the second unit of data does not satisfy the second set of safety equipment criteria, wherein the second computing device is not notified of the first unit of data satisfying the first set of safety equipment criteria.

9. The system of claim 8, wherein the program instructions being executable to cause the system to notify the second computing device includes being executable to cause the system to generate an alert dialog on the first computing device for display on the first computing device.

10. The system of claim 8, wherein the first and second computing devices are mobile smartphone devices.

11. The system of claim 8, wherein the program instructions being executable to cause the system to notify the second computing device includes being executable to cause the system to transmit an audio signal to a radio device coupled to equipment of the set of safety equipment.

12. The system of claim 8, wherein the set of safety equipment criteria is based on a PPE requirement protocol.

13. The system of claim 8, wherein the second computing device is the first computing device.

14. The system of claim 8, wherein the first location transmitter beacon is attached to an apparatus that a worker wearing the first set of safety equipment must use to perform the first work task, wherein the apparatus is not wearable.

15. The system of claim 14, wherein the first unit of data specifies that in order to work with the apparatus, the worker must wear the first set of safety equipment.

16. A computer program product for verifying a set of safety equipment criteria, the computer program product comprising a computer readable storage medium having program instructions the program instructions executable by a first computing device to cause the first computing device to:
receive, at the first computing device, user input indicating that the user will perform a particular job task;
transmit, over a network, the user input to a first server computing device, the first server computing device corresponding to a work order service, wherein the first server computing device transmits data associated with the particular job task that the user will perform to a second server computing device, the second server computing device corresponding to a safety service, the safety service stores safety equipment requirements for each stage of particular job tasks;
receive, from the second server computing device, a first unit of data at, the first unit of data received via a wireless signal between the first computing device and a set of sensing devices, the first unit of data identifying a set of safety equipment that includes the set of sensing devices, the set of sensing devices configured to transmit the first unit of data;
monitor the wireless signal between the first computing device and the set of sensing devices and determining that a signal strength for the wireless signal is not below a threshold value, the signal strength for the wireless signal being below the threshold value corresponding to a person not having in possession any articles of the set of safety equipment; and
notify a second computing device, in response to the determining that the signal strength for the wireless signal is not below the threshold value.

17. The computer program product of claim 16, wherein the program instructions executable by the first computing device to cause the first computing device to notify the second computing device includes transmitting an audio signal to a radio device coupled to equipment of the set of safety equipment.

18. The computer program product of claim 16, wherein the program instructions executable by the first computing device further cause the first computing device to:
determine, via the first computing device, that the first unit of data satisfies a set of safety equipment criteria; and
notifying the second computing device, in response to the determining that the first unit of data satisfies the set of safety equipment criteria.

19. The computer program product of claim 18, wherein the program instructions executable by the first computing device further cause the first computing device to:
receive, from a location transmitter beacon, a second unit of data, the location transmitter beacon being coupled to a unit of equipment that a person performs a job task with, the second unit of data being associated with specifying the set of safety equipment criteria required for the job task.

20. The computer program product of claim 18, wherein the program instructions executable by the first computing device further cause the first computing device to receive a second unit of data from a location transmitter, the second unit of data identifying the set of safety equipment criteria.

* * * * *